UNITED STATES PATENT OFFICE.

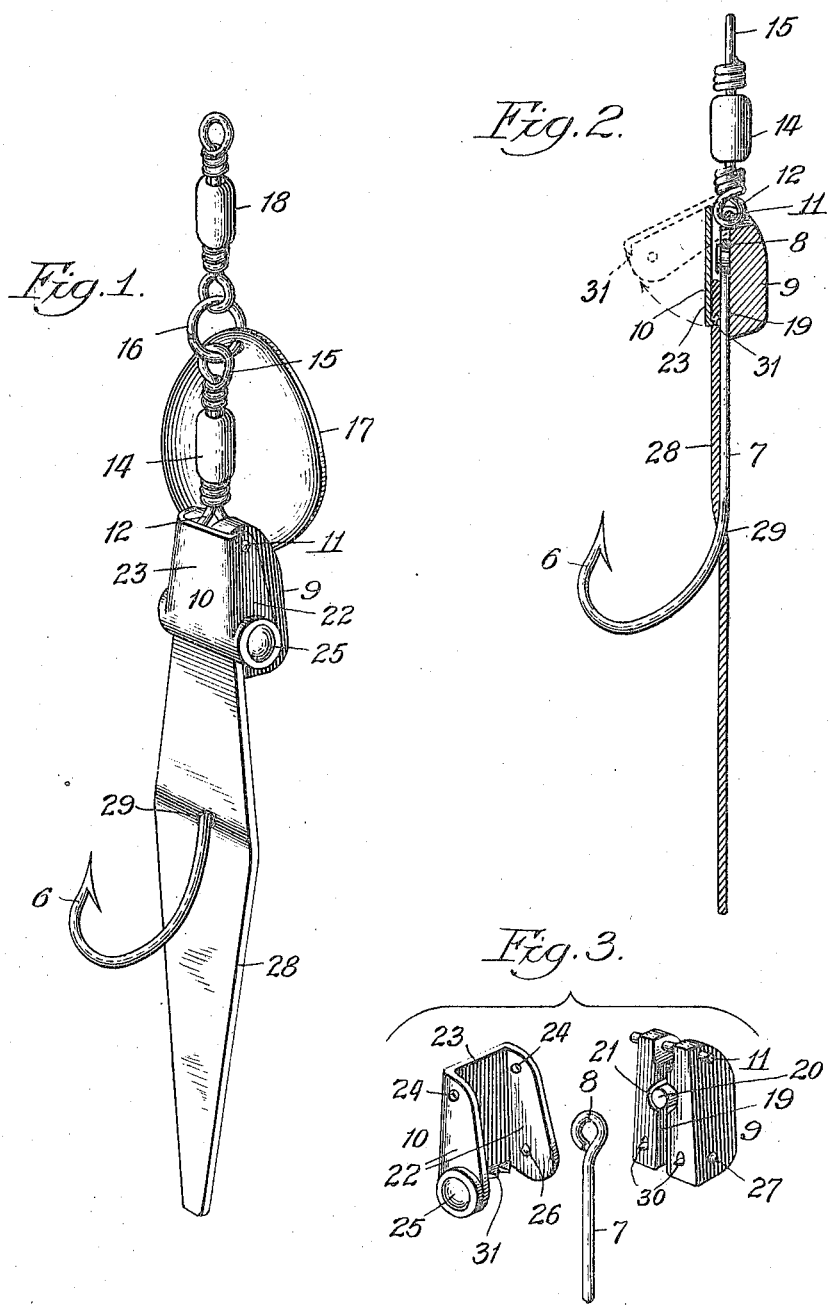

WILLIAM A. FOSS, OF CLEVELAND, OHIO.

ARTIFICIAL BAIT AND HOOK.

1,264,626.　　　　Specification of Letters Patent.　　Patented Apr. 30, 1918.

Application filed December 29, 1915. Serial No. 69,146.

*To all whom it may concern:*

Be it known that I, WILLIAM A. FOSS, a citizen of the United States, and a resident of Cleveland, in the county of Cuyahoga and State of Ohio, have invented certain new and useful Improvements in Artificial Bait and Hooks, of which the following is a full, clear, and exact description.

The invention relates to artificial bait and hooks and more particularly to that type in which a strip of flexible material, such as pork rind or rubber is impaled upon a hook. One object of the invention is to provide an improved device which is provided with a clamp in front of the hook for securing the front end of a strip of pork rind or other suitable material in connected relation to the hook. Another object is to provide a device of this character which is properly weighted to keep the hook upright and prevent its turning in the water. A still further object of the invention is to provide an improved device which permits ready replacement of the pork-rind and hook and which is simple in construction.

The invention consists in the several novel features hereinafter set forth and more particularly defined by claims at the conclusion hereof.

In the drawings: Figure 1 is a perspective of a device embodying the invention. Fig. 2 is a section. Fig. 3 is a perspective of the several parts of the clamping device and the eye-portion of the hook, the parts being shown in separated relation.

The invention comprises a fish hook consisting of a hook proper 6, a shank 7, and an eye 8 all integrally formed. The front end or eye of the hook is connected to a clamping device comprising a pair of members 9 and 10. A pivot pin 11 extends transversely through and pivotally connects the clamping members and is connected to one eye 12 of a swivel 14 of usual construction. The other eye 15 of this swivel is connected to a split ring 16 carrying a spinner or spoon 17. Ring 16 serves to connect the swivel 14 to a front swivel 18 of usual construction and to which the line is connected. This double swivel with a ring-connection permits the spoon 17 to revolve without rotating the front eye of swivel 18, to which the line is usually connected, and without rotating the rear eye of swivel 14 to which the clamping device and fish hook are connected.

Clamping member 9 is provided with a longitudinal groove or pocket 19 in the top face thereof which is adapted to receive the front portion of the shank of the fish hook and with a stud 20 around which a circular groove 21 is formed for the reception of the eye 8 of the fish-hook. Stud 20 is adapted to pass into the eye of the hook and this construction serves firmly to secure the entire hook against rotation relative to the clamp. Clamping member 10 comprises side-walls or flanges 22 and an integral cross or top wall which is adapted to overlie member 9 and the eye 8 of the fish hook and to close grooves 19 and 21 to hold the hook in said grooves. Pivot pin 11 extends through holes 24 in and adjacent the front ends of flanges 22. The rear portions of these flanges are provided with jewels 25 to resemble the eyes of a fish and both of the clamping members are tapered forwardly, so that the clamping device, as an entity, will have the appearance of a fish-head. Flanges 22 are slightly resilient and are adapted to press snugly against the sides of member 9 to frictionally hold the clamping members together, and to further secure them, studs 26 are formed on the inner faces of flanges 22 to enter recesses 27 in the sides of member 9, the reclining of the flanges permitting these studs to be forced into and out of the recesses by relative movement of the members.

The top face of member 9 and the cross wall 23 extend transversely to the hook and form, in effect, transversely extending clamping jaws for securing the front end of a strip of pork rind 28 or other suitable material, the central portion of which is impaled on the hook, as at 29, while the rear portion is left comparatively free to wiggle in the water in resemblance of a tail to the clamping members.

In placing the pork rind or strip on the hook, its central portion is first impaled on the hook and then slipped around to the position indicated in Fig. 2, so that its front end will be disposed between the clamping members 9 and 10. By impaling the rind on the hook, a sufficient portion thereof will be held on the top of the shank of the hook so that all portions of the rind will be sufficiently near the hook to insure the fish striking the hook proper. The spinner exemplifies means which causes the tail-piece to wiggle freely by vibrating the body or agitating the water around the body, and as a result of this wiggling, the bait as it is drawn through the water is life-like in appearance. The upper face of member 9 is formed with upwardly extending prongs or teeth 30 and the rear edges of the wall 23 is formed with downwardly extending teeth 31 to penetrate the front end of the strip 28 and rigidly and fixedly secure it on the hook. Member 9 is formed to act as a weight whereby the fish hook will be kept in upright position to avoid catching weeds and in which position it has been found it is more efficient in catching the fish.

The invention exemplifies an improved artificial bait which is simple in construction and in which a transversely extending clamp is provided adjacent the front end of the fish hook for securing the front end of a flexible strip which has been impaled on the hook and drawn downwardly onto the shank so that it cannot slip off the hook while it is held at its front end. The flexible strip is substantially flat transversely and when held on the hook and in the clamp does not cause the bait to twist in the water. In fishing, it has been found that a comparatively thin flexible strip, such as pork rind or rubber, serves to attract the fish and the invention provides an improved device, particularly adapted for use with such a strip. The flexible strip may be easily removed by separation of the clamping members and the necessity of hooking the strip at two points is avoided. When the clamp is open, the hook, as well as the strip, can be readily removed from the clamp which is desirable either when the prong of the hook becomes broken, so that replacement is necessary, or when replacement of the flexible strip is desired. The device, in its entirety, is simple in construction and avoids the use of a plurality or gang of hooks which is desirable in many instances.

The invention is not to be understood as restricted to the details set forth, since these may be modified within the scope of the appended claims, without departing from the spirit and scope of the invention.

Having thus described the invention, what I claim as new and desire to secure by Letters Patent, is:

1. In a fishing device, the combination of a rigid body, a fish hook secured to said body, a substantially flat freely flexible strip extending and being free to wiggle rearwardly of the hook, means for rigidly securing the front end of the strip to the body, and means to cause the rear extension of the strip to wiggle.

2. In a fishing device, the combination of a rigid body, a fish hook secured to the body, a substantially flat freely flexible strip having a single tail-piece rearwardly of the hook that is free to wiggle, means for rigidly securing the front end of the strip to the body, and means at the front of the body to cause the tail-piece to wiggle.

3. In a fishing device, the combination of a rigid body having a surface thereon, a fish hook secured to said body, a substantially flat freely flexible strip having a tail-piece extending and free to wiggle rearwardly of the hook and having its front end extended to lap said surface, means to hold the front end of the strip lapped on said surface of the body, and means to cause the tail-piece to wiggle.

4. In a fishing device, the combination of a rigid body, a fish hook secured to said body, a substantially flat freely flexible strip extending and being free to wiggle rearwardly of the hook, said body comprising a member provided with a substantially flat transversely extending surface, said strip having its front end extended to lap said surface flatwise, means for securing the front end of the strip on said surface, and means for causing the tail-piece to wiggle.

5. In a fishing device, the combination of a body provided with a substantially horizontal surface, a single hook having its shank rigidly secured to the body and disposed rearwardly and upwardly thereof, a substantially flat freely flexible strip impaled on the hook, having its front end extended to lap said surface flatwise and having a single tail-piece free to wiggle rearwardly of the hook, means to secure the front end of the strip on said surface, and means for causing the tail-piece to wiggle.

6. In a fishing device, the combination of a fish hook, a rigid artificial body in the form of a fish head at the front end of and rigidly secured to the hook, a substantially flat freely flexible strip having its front end extended to lap the body and having a tail-piece extending and free to wiggle rearwardly of the hook, means to secure the front end of the strip to the body, and means to cause the tail-piece to wiggle.

7. In a fishing device, the combination of a body comprising a pair of transversely extending clamping members, a fish hook secured to said body, a substantially flat freely flexible strip extending and being free to wiggle rearwardly of the hook and having its front end extended to be clamped flatwise between said transversely extending members, and means to cause the rear extension of the tail-piece to wiggle.

8. In a fishing device, the combination with a fish hook comprising a hook proper, a shank and an eye, of a flexible strip and clamp provided with means for receiving and removably holding the eye of the hook and comprising connected transversely extending members for holding the front end of the flexible strip on the shank of the hook.

9. In a fishing device, the combination with a fish hook comprising a hook proper, a shank and an eye, of a flexible strip and a clamp comprising separable transversely extending members formed to removably hold the front end of the flexible strip and the front end of the hook between them.

10. In a fishing device, the combination with a fish hook comprising a hook proper, a shank and an eye, of a flexible strip and a clamp provided with means for receiving and holding the eye of a hook and comprising transversely extending members formed to hold the flexible strip of material on the shank of the hook, and frictionally held together, and a transversely extending pivot between the members.

11. In a fishing device, the combination with a fish hook comprising a hook proper, a shank and an eye, of a flexible strip and a clamp comprising separable transversely extending members for holding the front end of the flexible strip on the hook, one of said members having a groove therein to receive the eye and the front portion of the shank of the hook.

12. In a fishing device, the combination with a fish-hook comprising a hook proper, a shank and an eye, of a flexible strip, and a clamping head comprising a pair of separable members for holding the front end of the flexible strip on the hook, one of said members comprising a cross wall and resilient side walls for securing the members together, and a pivotal connection between the members.

WILLIAM A. FOSS.